(12) United States Patent
Sishtla et al.

(10) Patent No.: US 12,553,990 B2
(45) Date of Patent: Feb. 17, 2026

(54) HYBRID CLUTTER SUPPRESSION USING ELECTRONICALLY SCANNED ANTENNAS

(71) Applicant: Rockwell Collins, Inc., Cedar Rapids, IA (US)

(72) Inventors: Venkata A. Sishtla, Cedar Rapids, IA (US); Xingming Wang, Marion, IA (US); James B. West, Cedar Rapids, IA (US); Jacob G. Teague, West Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 562 days.

(21) Appl. No.: 17/974,924

(22) Filed: Oct. 27, 2022

(65) Prior Publication Data
US 2024/0142574 A1    May 2, 2024

(51) Int. Cl.
*G01S 7/41*    (2006.01)
*G01S 13/90*    (2006.01)
(Continued)

(52) U.S. Cl.
CPC .......... *G01S 7/414* (2013.01); *G01S 13/9056* (2019.05); *H01Q 3/28* (2013.01); *H01Q 3/36* (2013.01)

(58) Field of Classification Search
CPC .... H01Q 21/061; H01Q 3/36; G01S 13/4454; G01S 13/933; G01S 7/023; G01S 7/414
See application file for complete search history.

(56) References Cited

U.S. PATENT DOCUMENTS 1,159,635 A    11/1915  Wolfe et al.
5,093,666 A *  3/1992   Jamison ............... G01S 13/4409
                                                                     342/65
(Continued)

FOREIGN PATENT DOCUMENTS

CA    1096019 A    2/1981
CN    103809164 B  6/2016
(Continued)

OTHER PUBLICATIONS

Extended European Search Report dated Mar. 25, 2024; European Application No. 23206522.7.
(Continued)

*Primary Examiner* — Vladimir Magloire
*Assistant Examiner* — Peter Davon Doze
(74) *Attorney, Agent, or Firm* — Suiter Swantz IP

(57) ABSTRACT

A system and method for distinguishing targets of interest from main lobe clutter and sidelobe clutter includes an ESA or AESA divided into subarrays. A sum beam power profile is produced via one or more scans of the subarrays, and a difference beam power profile is produced via calculations involving the subarrays. A comparison of the sum beam power profile and the difference beam power profile accentuates signal power disparities between targets of interest and clutter. A threshold is then applied to isolate targets of interest. Different difference beam power profiles may be used for elevation comparisons and azimuth comparisons. Alternatively, subarrays may be selected such that the same difference beam power profile may be used for both elevation and azimuth. Scans may be time multiplexed such that data from different scans may be used to produce the sum beam power profile, the difference beam power profile, or both.

15 Claims, 4 Drawing Sheets

(51) Int. Cl.
    *H01Q 3/28*    (2006.01)
    *H01Q 3/36*    (2006.01)

(56) References Cited

U.S. PATENT DOCUMENTS

| | | | |
|---|---|---|---|
| 6,297,772 | B1 | 10/2001 | Lewis |
| 9,019,145 | B1 | 4/2015 | Sishtla et al. |
| 9,971,027 | B1 * | 5/2018 | Stockmann ......... G01S 13/5244 |
| 2003/0085833 | A1 | 5/2003 | Yu |
| 2013/0113651 | A1 * | 5/2013 | Leise .................. H01Q 21/061 |
| | | | 342/146 |

FOREIGN PATENT DOCUMENTS

| | | | | |
|---|---|---|---|---|
| CN | 110146851 | A | 8/2019 | |
| EP | 0076536 | B1 | 3/1987 | |
| EP | 0621492 | A1 | 10/1994 | |
| EP | 0542440 | B1 * | 3/1996 | ............. H01Q 25/02 |
| EP | 3968053 | A1 | 3/2022 | |
| EP | 3971613 | A1 | 3/2022 | |
| GB | 2039187 | A | 7/1980 | |

OTHER PUBLICATIONS

Skolnik, Merill I.: "Radar handbook/Merrill I. Skolnik, editor in chief", Radar Handbook, Jan. 1, 2008 (Jan. 1, 2008), p. 1-4, 196-206, 244-246, 345-353, 439-452.

* cited by examiner

HYBRID CLUTTER SUPPRESSION USING ELECTRONICALLY SCANNED ANTENNAS

BACKGROUND

For airborne radars, detecting moving targets or mapping runway environments is challenging due to the presence of ground clutter. Detecting these targets is critical for autonomous operation. Electronically scanned array antennas (ESA), including Active Electronically Scanned Arrays (AESA), have high sidelobe levels which can result in false or missed detections. Doppler based clutter rejection techniques are not adequate to remove all clutter using an AESA because of subtle changes in far-field beam parameters within the scan volume. It would be advantageous to have a system method for compensating for ground clutter with AESA radar systems.

SUMMARY

In one aspect, embodiments of the inventive concepts disclosed herein are directed to a system and method for distinguishing targets of interest from main lobe clutter and sidelobe clutter. An AESA is divided into subarrays. A sum beam power profile is produced via one or more scans of the subarrays, and a difference beam power profile is produced via calculations involving the subarrays. A comparison of the sum beam power profile and the difference beam power profile accentuates signal power disparities between targets of interest and clutter. A threshold is then applied to isolate targets of interest.

In a further aspect, different difference beam power profiles may be used for elevation comparisons and azimuth comparisons. Alternatively, subarrays may be selected such that the same difference beam power profile may be used for both elevation and azimuth.

In a further aspect, scans may be time multiplexed such that data from different scans may be used to produce the sum beam power profile, the difference beam power profile, or both.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
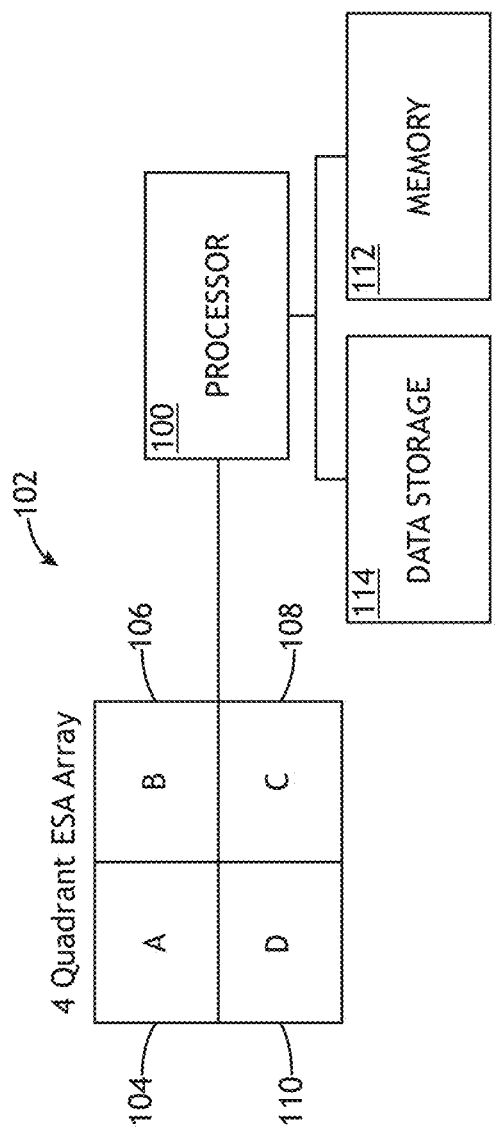
FIG. 1 shows a block diagram of a system according to an exemplary embodiment.

Before explaining various embodiments of the inventive concepts disclosed herein in detail, it is to be understood that the inventive concepts are not limited in their application to the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of a feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Also, while various components may be depicted as being connected directly, direct connection is not a requirement. Components may be in data communication with intervening components that are not illustrated or described.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in at least one embodiment" in the specification does not necessarily refer to the same embodiment. Embodiments of the inventive concepts disclosed may include one or more of the features expressly described or inherently present herein, or any combination or sub-combination of two or more such features.

Broadly, embodiments of the inventive concepts disclosed herein are directed to a system and method for distinguishing targets of interest from main lobe clutter and sidelobe clutter. An ESA or AESA is divided into subarrays. A sum beam power profile is produced via one or more scans of the subarrays, and a difference beam power profile is produced via calculations involving the subarrays. A comparison of the sum beam power profile and the difference beam power profile accentuates signal power disparities between targets of interest and clutter. A threshold is then applied to isolate targets of interest. Different difference beam power profiles may be used for elevation comparisons and azimuth comparisons. Alternatively, subarrays may be selected such that the same difference beam power profile may be used for both elevation and azimuth, i.e., "on the diagonals". Scans may be time multiplexed such that data from different scans may be used to produce the sum beam power profile, the difference beam power profile, or both.

Referring to FIG. 1, a block diagram of a system according to an exemplary embodiment is shown. The system includes a processor 100 and AESA 102 in data communication with the processor 100. The processor 100 is configured via processor executable code stored in a memory 112 connected to the processor 100 to receive signals from, an apply signals to, the AESA 102. During scans near ground level, return signals may include significant main lobe clutter and sidelobe clutter. The AESA 102 provides degrees of freedom to reduce/remove clutter.

The AESA 102 defines a plurality of subarrays 104, 106, 108, 110. Each of the subarrays 104, 106, 108, 110 may be separately addressable/configurable by the processor 100 via signals that configured the phase shift and amplitude of individual radiating elements within the corresponding subarray 104, 106, 108, 110. During normal operation the beam produced by the AESA 102 is effectively the sum of all subarrays 104, 106, 108, 110; the energy coming out of the subarrays 104, 106, 108, 110 defines a sum beam. Return signals received from the AESA 102 or subarrays 104, 106, 108, 110 may be used to produce return signal power profiles wherein return signals are characterized according to a power and distance of the corresponding return signal. It may be appreciated that specific embodiments described herein are directed to a narrow band AESA. The principles are also applicable to ultra-wide band AESAs incorporating time delay units instead of phase shifters.

The processor 100 receives return signals form the AESA 102 and/or subarrays 104, 106, 108, 110 and produces a sum beam power profile corresponding to a summation of the power of each return signal for a given distance for each of the sub arrays 104, 106, 108, 110. Furthermore, the processor 100 produces a difference beam power profile. The difference beam power profile is produced subtracting certain subarray 104, 106, 108, 110 return signals depending on whether an elevation or azimuth difference beam power profile is desired. For example, when producing the difference beam power profile in elevation, the processor 100 may add the return signals corresponding to a first subarray 104 and a second subarray 106, and subtract from that the sum of the return signals from a third subarray 108 and a fourth subarray 110. Alternatively, when producing the difference beam power profile in azimuth, the processor 100 may add the return signals corresponding to the first subarray 104 and the fourth subarray 110, and subtract from that the sum of the return signals from the second subarray 106 and the third subarray 108. In at least one embodiment, both difference beam power profiles may be computed using only the first subarray 104 and the third subarray 108. The delta between the sum beam power profile and the difference beam power profile allows the processor to easily identify sidelobe clutter and distinguish clutter from targets of interest.

Exemplary embodiments illustrate a four quadrant AESA 102 having a first subarray 104, a second subarray 106, a third subarray 108, and a fourth subarray 110, but different numbers of subarrays 104, 106, 108, 110 are envisioned. For example, an AESA 102 is envisioned with nine subarrays (i.e., a three-by-three array). The size of the AESA 102 may be flexible and may depend on the ultimate application. The computation for an elevation difference beam for an exemplary three-by-three array would be by summation of top three subarrays minus the summation of the bottom three subarrays.

In at least one embodiment, the sum beam power is the sum of signals from each of the subarrays. A difference beam power in elevation may be computed as the top two subarrays minus the bottom two subarrays; the difference beam power in azimuth may be computed as the leftmost subarrays minus the rightmost subarrays.

In at least one embodiment, the AESA 102 comprises radiating elements which offer better clutter suppression or ground target identification as compared to alternatives.

In at least one embodiment, radiating elements from one of the subarrays 104, 106, 108, 110 may be adaptively turned off based on the phase of flight to closely emulate a wide field of view radiation pattern. A pulse-pair power difference between a wide field of view pattern and the full aperture pattern may be used to identify and eliminate sidelobes. A monopulse antenna may also be used to identify and remove sidelobes using a single pulse. Subtracting the sum beam power profile from the difference beam power profile may identify sidelobe power and some parts of main lobe power at low altitudes. These techniques may also allow reduction of clutter while preserving targets of interest.

In at least one embodiment, the processor 100 may configure the subarrays 104, 106, 108, 110 what application is being performed. Different design objectives in processing may necessitate different AESA 102 configurations.

In another embodiment, the processor 100 may utilize a pulse pair where a first pulse is processed as the sum beam and a second pulse is processed as a partial array. In at least one embodiment, if more precision is desired, the processor 100 may turn on certain number of elements within the first subarray 104 as part of the second pulse. The beams may be time multiplexed, but do not need to be.

In at least one embodiment, the processor 100 may produce a beam power profile that is the summation of a sum of all subarrays 104, 106, 108, 110, an azimuth difference beam power profile, and an elevation difference beam power profile. When plotting such a beam power profile, main lobe clutter is easily identified and removed via some threshold filter.

In at least one embodiment, the subarrays 104, 106, 108, 110 may be configured for monopulse operation along a diagonal axis (i.e., 45°), which may shift the distinction between azimuth and elevation, and effectively decoupling those calculations from the physical orientation of the subarrays 104, 106, 108, 110. In at least one embodiment, the AESA 102 may be electronically configured along a diagonal axis; alternatively, each of the subarrays 104, 106, 108, 110 may be individually configured along a diagonal axis. Such diagonal axis may be useful for banking aircraft.

Figure 2:
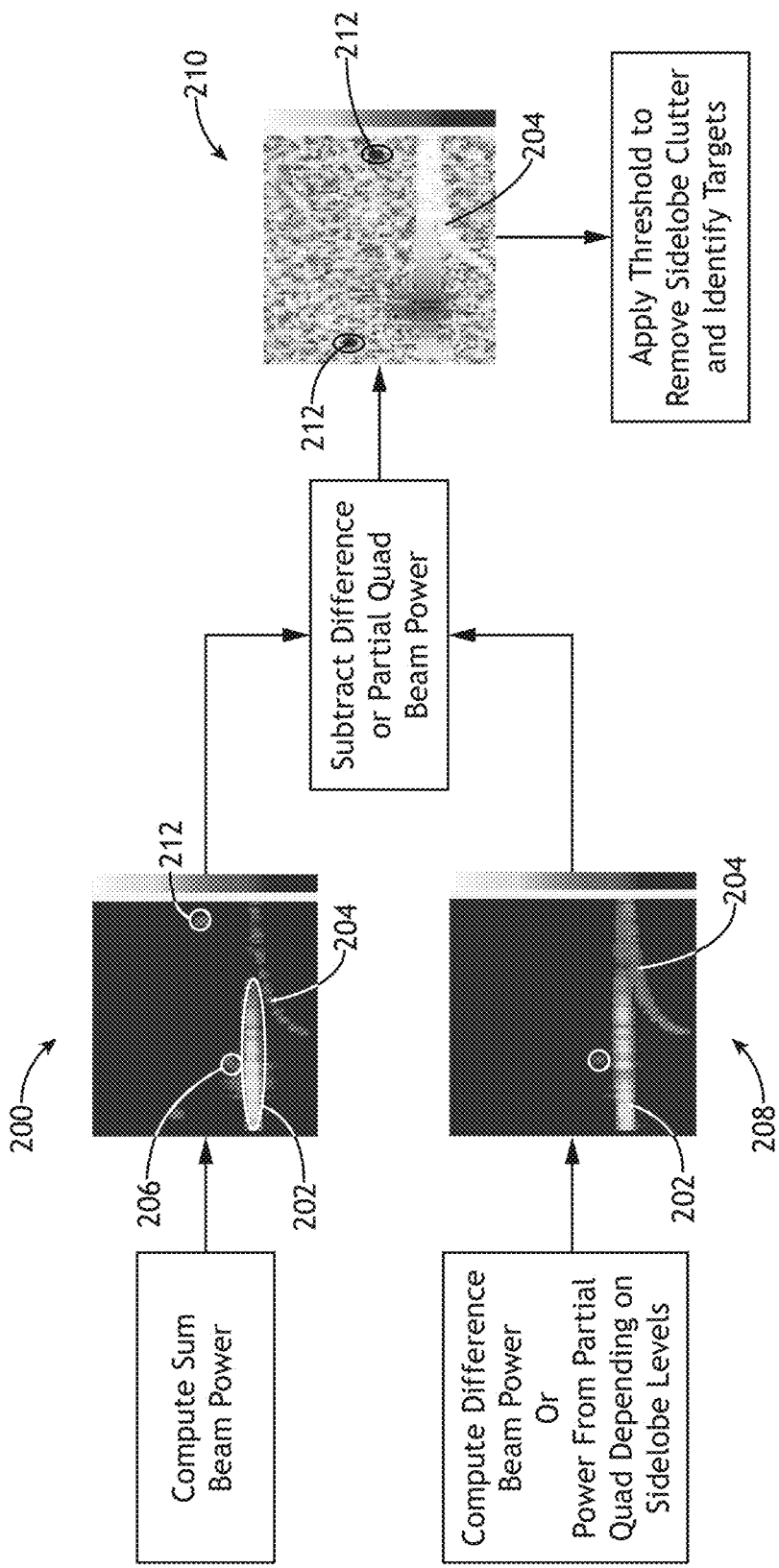
FIG. 2 shows radar returns according to an exemplary embodiment.

Referring to FIG. 2, radar returns according to an exemplary embodiment are shown. AESA radars are susceptible to extra sidelobe clutter 204. Sidelobe clutter 204 is problematic for several applications such as detect and avoid, predictive windshear. An airborne radar system having a segmented AESA may receive return signals and produce range Doppler maps from the return signals, where the X axis is a range and Y axis is the Doppler bin for that range. The range Doppler maps may include main lobe clutter 202 and sidelobe clutter 204. The range Doppler maps show the main lobe clutter and the sidelobe clutter, as well as ground targets 206 (e.g., a car) and airborne targets 212.

The radar system, or a processor in data communication with such radar system, produces a sum beam power profile 200 corresponding to a first range Doppler map, and a difference beam power profile 208 corresponding to a second range Doppler map. In difference beam power profile 208, sidelobe clutter 204 may be more pronounced as compared to the sum beam power profile 200. Furthermore, targets of interest such as the airborne targets 212 do not appear in the difference beam power profile 208. A delta power profile 210 corresponding to a difference between the sum beam power profile 200 and the difference beam power profile 208 accentuates the distinction between the sidelobe clutter 204 and targets of interest such as airborne targets 212. Real targets show up on one side of the power scale, and sidelobe clutter shows up on the other side of the power scale.

In at least one embodiment, the radar system or processor may apply some predetermined threshold to determine if the power of a given target is below the threshold value, and therefore considered a sidelobe clutter or some part of main lobe clutter. If the power of the target is above the threshold, it is considered a real target of interest.

In at least one embodiment, instead of a difference beam, the radar system or processor may turn off some of the elements and create a beam wherein the processor may compare the sum beam power profile 200 to a partial quad to create a similar delta power profile 210. In such embodiment, processing may be done in a single step.

In at least one embodiment, AESA elements activated as part of the subarray may be adaptive based on sidelobe clutter 204 power of prior pulses.

Figure 3:
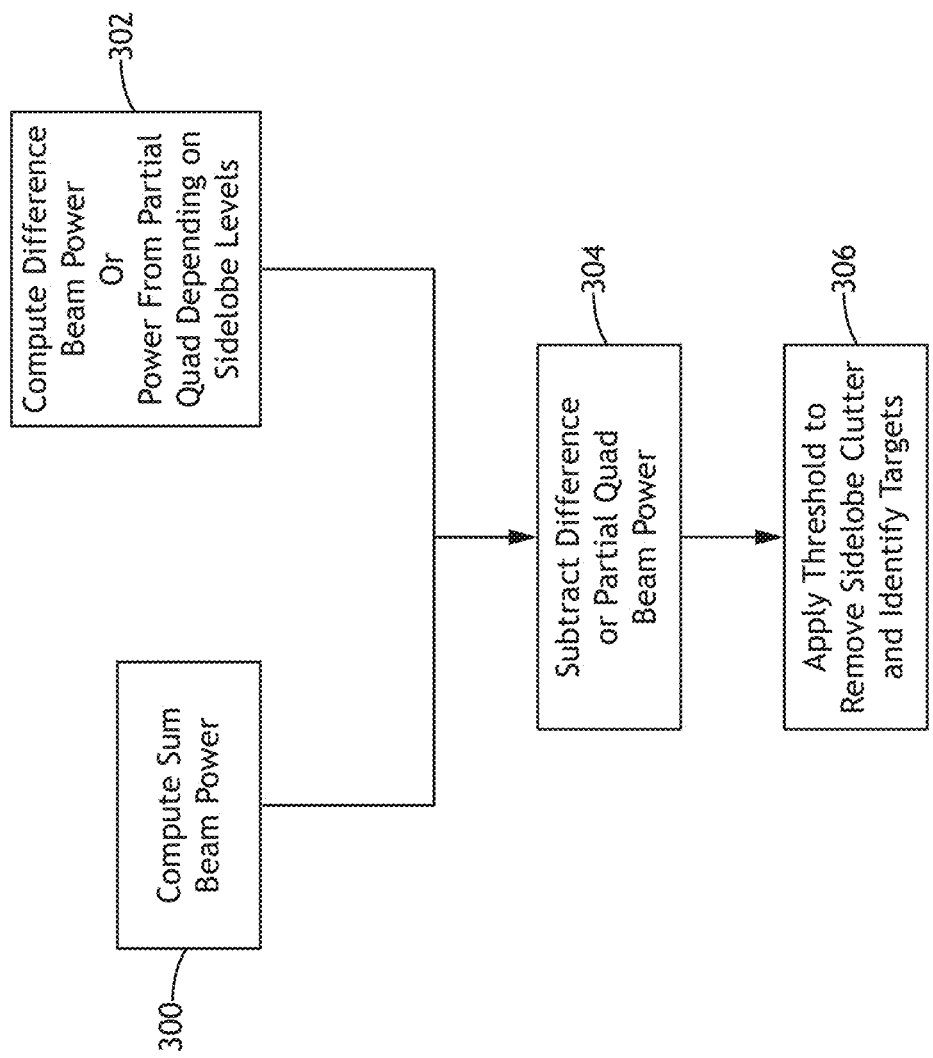
FIG. 3 shows a flowchart of a method according to an exemplary embodiment.

Referring to FIG. 3, a flowchart of a method according to an exemplary embodiment is shown. Radar system processor, or processor in data communication with a radar system, receives return signals from the radar system AESA divided into a plurality of subarrays. The processor computes 300 a sum beam power profile by summing range Doppler map data from each subarray, and computes 302 a difference beam power profile. In one embodiment, the difference beam power profile is computed by calculating the difference in range Doppler map data between two subarrays or sets of subarrays. In an alternative embodiment, the difference beam power profile is extrapolated from partial quad beam power.

The processor subtracts 304 the difference beam power profile from the sum beam power profile, and applies 306 a threshold value to remove sidelobe clutter and identify real targets of interest.

Figure 4:
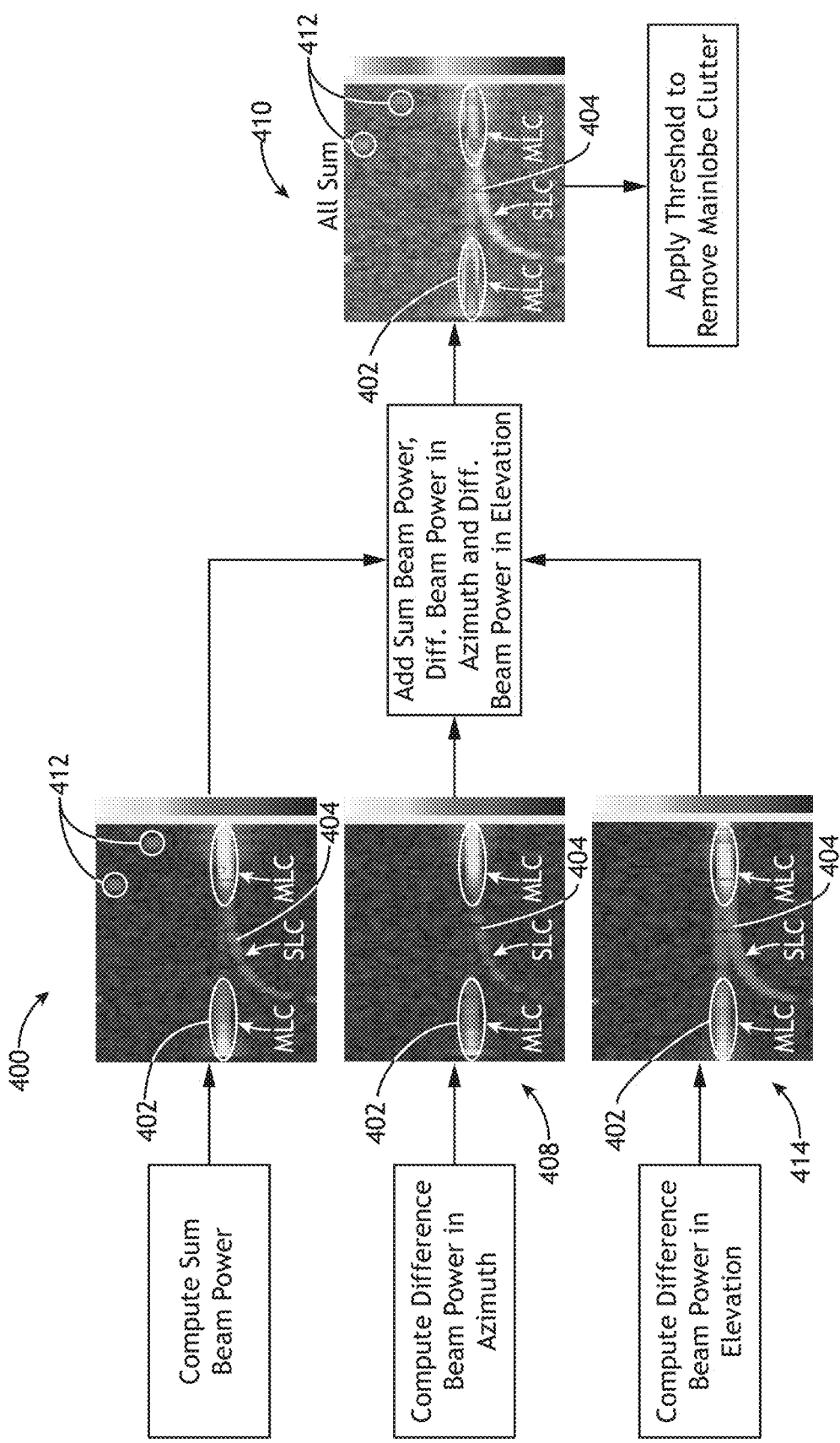
FIG. 4 shows radar returns according to an exemplary embodiment.

Referring to FIG. 4, radar returns according to an exemplary embodiment are shown. An airborne radar system having a segmented ESA may receive return signals and produce range Doppler maps from the return signals, where the X axis is a range and Y axis is the Doppler bin for that range. The range Doppler maps may include main lobe clutter 402 and sidelobe clutter 404. The range Doppler maps show the main lobe clutter and the sidelobe clutter, as well as desired targets 412.

The radar system, or a processor in data communication with such radar system, produces a sum beam power profile 400 corresponding to a first range Doppler map, an azimuth difference beam power profile 408 corresponding to a second range Doppler map, and an elevation difference beam profile 414 corresponding to a third range Doppler map. The radar system or processor may then produce a beam power profile 410 corresponding to a summation of the sum beam power profile 400, azimuth difference beam profile 408, and elevation difference beam profile 414.

In the beam power profile 410, the main lobe clutter 402 can be easily identified. The radar system or processor may apply a filter threshold to remove the main lobe clutter 402 without removing desired targets 412. In at least one embodiment, such a beam power profile 410 and filter threshold may be used to remove main lobe clutter 402 while a corresponding process described herein may be used to remove sidelobe clutter. After such a two-step process, the radar system or processor may produce a clutter free range doppler map, which would enhance the performance of subsequent target detection (weather, air targets, or windshear events).

It is believed that the inventive concepts disclosed herein and many of their attendant advantages will be understood by the foregoing description of embodiments of the inventive concepts, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The forms herein before described being merely explanatory embodiments thereof, it is the intention of the following claims to encompass and include such changes. Furthermore, any of the features disclosed in relation to any of the individual embodiments may be incorporated into any other embodiment.

What is claimed is:

1. A computer apparatus comprising:
    an active electronically scanned array (AESA) comprising a plurality of subarrays;
    at least one processor in data communication with the AESA and a memory storing processor executable code for configuring the at least one processor to:
        receive one or more return signals from the AESA;
        calculate a sum beam power profile based on the one or more return signals;
        calculate a difference beam power profile comprising an azimuth difference power profile, based on the one or more return signals;
        calculate an elevation beam power profile based on the one or more return signals;
        calculate a summation beam power profile corresponding to a summation of the sum beam power profile, the difference beam power profile, and the elevation beam power profile;
        subtract the difference beam power profile from the sum beam power profile to produce a delta power profile;
        apply a first predetermined threshold to the summation beam power profile to identify and suppress main lobe clutter;
        apply a second predetermined threshold to the delta power profile to identify and suppress sidelobe clutter; and
        identify one or more targets of interest from the delta power profile.

2. The computer apparatus of claim 1, wherein the at least one processor is further configured to electronically configure the AESA along an axis defined by a 45° diagonal along a surface of the AESA.

3. The computer apparatus of claim 1, wherein calculating the difference beam power profile comprises:
    summing a set of leftmost subarrays;
    summing a set of rightmost subarrays; and
    subtracting the summed rightmost subarrays from the summed leftmost subarrays.

4. The computer apparatus of claim 1, wherein calculating the difference beam power profile comprises subtracting a bottom left subarray from a top right subarray.

5. The computer apparatus of claim 1, wherein:
the sum beam power profile is calculated from a first return signal; and
the difference beam power profile is calculated from a second return signal.

6. A method comprising:
configuring an active electronically scanned array (AESA) as a plurality of subarrays;
receiving one or more return signals from the AESA;
calculating a sum beam power profile based on the one or more return signals;
calculating a difference beam power profile comprising an azimuth difference power profile, based on the one or more return signals;
calculating an elevation beam power profile based on the one or more return signals;
calculating a summation beam power profile corresponding to a summation of the sum beam power profile, the difference beam power profile, and the elevation beam power profile;
subtracting the difference beam power profile from the sum beam power profile to produce a delta power profile;
applying a first predetermined threshold to the summation beam power profile to identify and suppress main lobe clutter;
applying a second predetermined threshold to the delta power profile to identify and suppress sidelobe clutter; and
identifying one or more targets of interest from the delta power profile.

7. The method of claim 6, wherein calculating the difference beam power profile comprises:
summing a set of topmost subarrays;
summing a set of bottommost subarrays; and
subtracting the summed bottommost subarrays from the summed topmost subarrays.

8. The method of claim 6, wherein calculating the difference beam power profile comprises:
summing a set of leftmost subarrays;
summing a set of rightmost subarrays; and
subtracting the summed rightmost subarrays from the summed leftmost subarrays.

9. The method of claim 6, wherein calculating the difference beam power profile comprises subtracting a bottom left subarray from a top right subarray.

10. The method of claim 6, wherein:
the sum beam power profile is calculated from a first return signal; and
the difference beam power profile is calculated from a second return signal.

11. A radar system comprising:
an active electronically scanned array (AESA) comprising a plurality of subarrays;
at least one processor in data communication with the AESA and a memory storing processor executable code for configuring the at least one processor to:
receive one or more return signals from the AESA;
calculate a sum beam power profile based on the one or more return signals;
calculate a difference beam power profile comprising an azimuth difference power profile, based on the one or more return signals;
calculate an elevation beam power profile based on the one or more return signals;
calculate a summation beam power profile corresponding to a summation of the sum beam power profile, the difference beam power profile, and the elevation beam power profile;
subtract the difference beam power profile from the sum beam power profile to produce a delta power profile;
apply a first predetermined threshold to the summation beam power profile to identify and suppress main lobe clutter;
apply a second predetermined threshold to the delta power profile to identify and suppress sidelobe clutter; and
identify sidelobe clutter from the delta power profile.

12. The radar system of claim 11, wherein the at least one processor is further configured to electronically configure the AESA along an axis defined by a 45° diagonal along a surface of the AESA.

13. The radar system of claim 11, wherein calculating the difference beam power profile comprises:
summing a set of leftmost subarrays;
summing a set of rightmost subarrays; and
subtracting the summed rightmost subarrays from the summed leftmost subarrays.

14. The radar system of claim 11, wherein calculating the difference beam power profile comprises subtracting a bottom left subarray from a top right subarray.

15. The radar system of claim 11, wherein:
the sum beam power profile is calculated from a first return signal; and
the difference beam power profile is calculated from a second return signal.

* * * * *